United States Patent
Lamberts et al.

(10) Patent No.: US 6,421,198 B1
(45) Date of Patent: Jul. 16, 2002

(54) LINEARITY COMPENSATION FOR A POSITION ERROR SIGNAL BASED ON REPEATABLE AND NON-REPEATABLE RUN OUT IN A DISK DRIVE

(75) Inventors: Bernd Lamberts, Cupertino; Louis Joseph Serrano, San Jose; Markus Staudenmann, San Jose; Mantle Man-Hon Yu, San Jose, all of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/300,026

(22) Filed: Apr. 27, 1999

(51) Int. Cl.[7] ............................................. G11B 5/596
(52) U.S. Cl. .................................................. 360/77.04
(58) Field of Search ......................... 360/77.04, 77.08, 360/75; 369/44.25, 44.32

(56) References Cited

U.S. PATENT DOCUMENTS

| | | | |
|---|---|---|---|
| 3,691,543 A | | 9/1972 | Mueller |
| 4,578,723 A | | 3/1986 | Betts et al. |
| 5,010,535 A | | 4/1991 | Davis |
| 5,072,318 A | | 12/1991 | Yu |
| 5,117,408 A | | 5/1992 | Weispfenning et al. |
| 5,241,433 A | | 8/1993 | Anderson et al. |
| 5,274,511 A | | 12/1993 | Ikeda |
| 5,550,685 A | * | 8/1996 | Drouin et al. ....... 360/77.04 X |
| 5,576,909 A | | 11/1996 | Dierkes et al. |
| 5,585,976 A | | 12/1996 | Pham |
| 5,668,679 A | | 9/1997 | Swearingen et al. |
| 5,687,038 A | | 11/1997 | Sugawara et al. |
| 5,771,131 A | | 6/1998 | Pirzadeh |
| 5,774,298 A | | 6/1998 | Cheung et al. |
| 5,793,559 A | | 8/1998 | Shepherd et al. |
| 5,818,659 A | | 10/1998 | Cheung et al. |
| 5,825,578 A | * | 10/1998 | Shrinkle et al. ..... 360/77.04 X |
| 5,825,579 A | | 10/1998 | Cheung et al. |
| 5,859,742 A | | 1/1999 | Takaishi |
| 5,867,341 A | | 2/1999 | Volz et al. |
| 5,867,353 A | | 2/1999 | Valent |
| 5,946,158 A | * | 8/1999 | Nazarian et al. ......... 360/77.04 |
| 5,982,173 A | * | 11/1999 | Hagen ................. 360/77.04 X |
| 6,115,203 A | * | 9/2000 | Ho .......................... 360/77.04 |

* cited by examiner

Primary Examiner—David Hudspeth
Assistant Examiner—K. Wong
(74) Attorney, Agent, or Firm—Gates & Cooper LLP

(57) ABSTRACT

Linearity compensation is provided for a position error signal based on repeatable and non-repeatable run out in a data storage device. The run out is measured on a track of the data storage device at a plurality of points, such as a track center and one or more points offset from the track center. The run out is typically measured using either an unstitched primary position error signal or an unstitched quadrature position error signal. The offsets are usually stitch points for the position error signal. A component of the run out is extracted at the points, wherein the component generally comprises one or more characteristics of the run out, such as a frequency, a set of frequencies, a root mean square, or some other characteristic of the run out. The linearizing equation to be used for the position error signal is identified based on the measured run out and generally comprises a polynomial function. The coefficients of the linearizing equation are adjusted so that the run out and the component of the run out are substantially similar at the points. These steps are repeated until a satisfactory fit is achieved in the linearizing equation. Once a satisfactory fit is achieved, the coefficients for the linearizing equation are stored in the data storage device, so that they can be accessed by a servo controller during operation of the data storage device. The servo controller uses the linearizing equation to generate a linearized position error signal that is used to improve a track following capability of the data storage device.

44 Claims, 6 Drawing Sheets

LINEARITY COMPENSATION FOR A POSITION ERROR SIGNAL BASED ON REPEATABLE AND NON-REPEATABLE RUN OUT IN A DISK DRIVE

CROSS-REFERENCE TO RELATED APPLICATIONS

This application is related to the following co-pending and commonly-assigned patent applications:

Application Ser. No. 09/300,071, entitled "POSITION ERROR SIGNAL LINEARIZATION USING AN AUXILIARY DISCONTINUITY REMOVAL ROUTINE", filed on same date herewith, by Jeffrey J. Dobbek, Greg M. Frees, Craig N. Fukushima, Louis J. Serrano, and Markus Staudenmann, Application Ser. No. 09/299,893, entitled "POSITION ERROR SIGNAL CALIBRATION USING MEASURED BURSTS, filed on same date herewith, by Jeffrey J. Dobbek, Blake Finstad, Greg M. Frees, Craig N. Fukushima, and Louis J. Serrano, both of which applications are incorporated by reference herein.

BACKGROUND OF THE INVENTION

1. Field of the Invention

The present invention relates generally to servo control systems used for positioning read/write transducers in data storage devices, and more particularly, to providing linearity compensation for a position error signal (PES) based on run out in a disk drive.

2. Description of Related Art

It is well known in the art to store data on magnetic or optical disk drives. Data is stored on a disk drive on one or more tracks of predetermined format disposed on a disk-shaped recording media. The data is written to and read from the tracks using one or more transducers, which typically comprise read/write heads. Reading data from a desired one of the tracks on the disk surfaces requires knowledge of the read/write head position relative to the track as the disk rotates and the head is moved across the disk, and requires precise centering of the head over the disk track. Conventionally, the read/write head is mounted on a head positioning assembly that is moved by a servo control loop.

The servo control loop controls movement of the head positioning assembly across the disk surface to move the read/write head from track to track (track seeking) and, once over a selected track, to maintain the read/write head in a path over the centerline of the track (track following). Centering the read/write head over a track permits accurate reading and recording of data in the track.

In most devices, the servo control loop is a closed loop system that utilizes position information obtained from the disk surface to provide feedback for the track seeking and track following functions. Some devices store servo information on a single, dedicated disk surface (known as a dedicated servo system), while other devices store servo information between the data regions of the disk surface (known as an embedded servo system).

Servo track information usually includes: a synchronization field, such as for automatic gain control (AGC) or similar signal detecting purposes; a track identification TID) field typically comprising a digitally encoded Grey code; and a position error signal (PES) field generally containing one or more burst patterns. The PES, which is proportional to the relative difference of the positions of the center of the read/write head and the nearest track centerline, is a corrective signal providing an indication of which direction the head should be moved to during either track seeking or track following functions.

As the track densities of disk drives increase, the accuracy of the PES becomes increasingly important. Unfortunately as track pitch decreases, the tolerances arising in the manufacture of the read/write heads do not decrease proportionately, and this results in heads that either write or read more narrowly relative to track pitch. This narrow read or write characteristic results in the PES signal varying in a non-linear fashion with the head position.

SUMMARY OF THE INVENTION

To minimize the limitations in the prior art described above, and to minimize other limitations that will become apparent upon reading and understanding the present specification, the present invention provides linearity compensation for a position error signal based on run out in a data storage device. The run out is measured on a track of the data storage device at a plurality of points, such as a track center and one or more points offset from the track center. The run out is typically measured using either an unstitched primary position error signal or an unstitched quadrature position error signal. The offsets are usually stitch points for the position error signal. A component of the run out is extracted at the points, wherein the component generally comprises at least one characteristic of the run out, such as a frequency, a set of frequencies, a root mean square, or some other characteristic of the run out. The linearizing equation to be used for the position error signal is identified based on the measured run out and generally comprises a polynomial function. The coefficients of the linearizing equation are adjusted so that the run out and the component of the run out are substantially similar at the measured points. These steps are repeated until a satisfactory fit is achieved in the linearizing equation. Once a satisfactory fit is achieved, the coefficients for the linearizing equation are stored in the data storage device, so that they can be accessed by a servo controller during operation of the data storage device. The servo controller uses the linearizing equation to generate a linearized position error signal that is used to improve a track following capability of the data storage device.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Disk Drive Components

Figure 1:
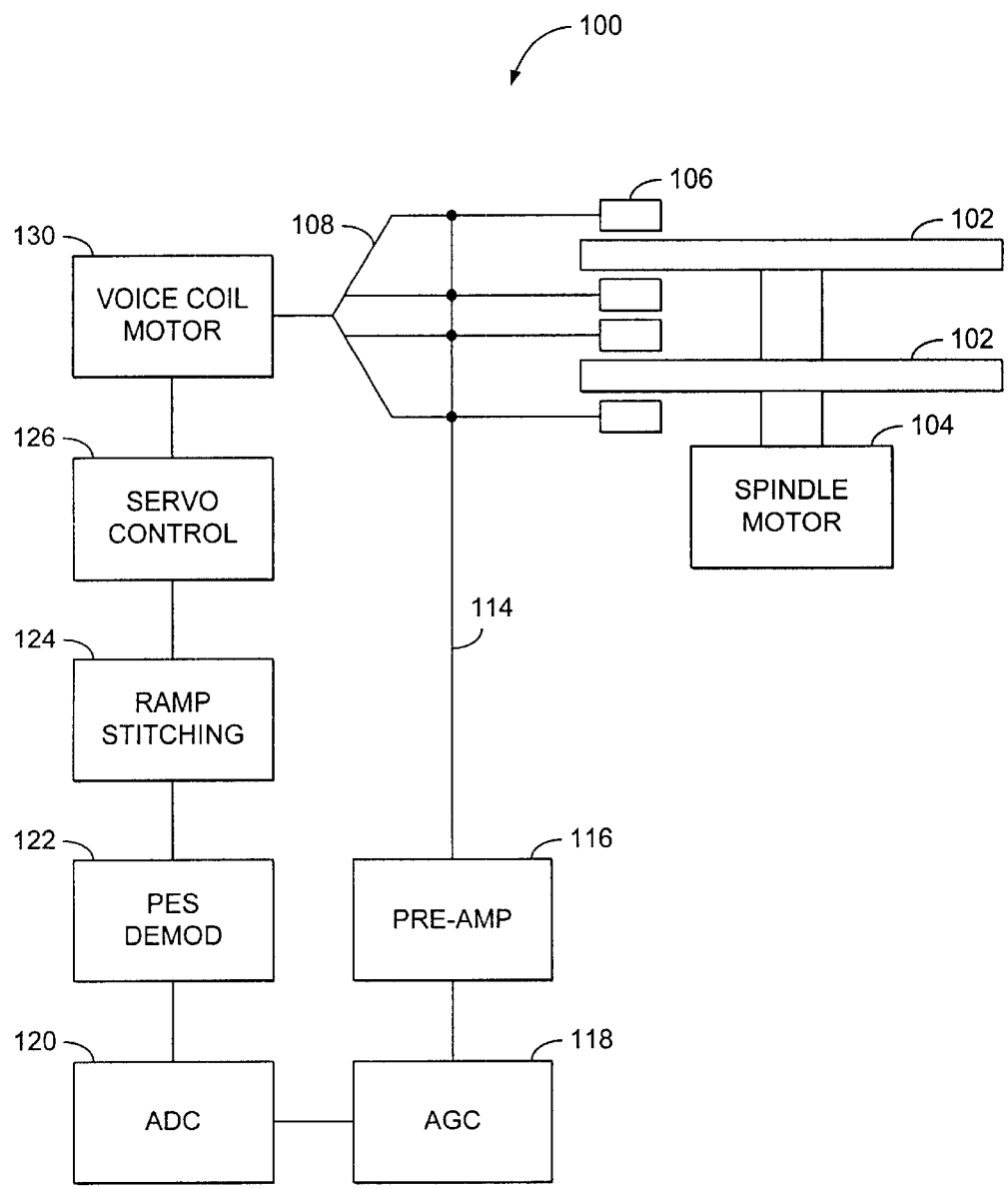
FIG. 1 illustrates the components of a data storage device according to the preferred embodiment of the present invention.

FIG. 1 is a block diagram of an exemplary disk drive 100 according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 100 stores information on the surfaces of one or more stacked disks 102 in the form of transitions or patterns formed on one or more data tracks. The disks 102 are rotatably mounted on a spindle motor 104. Transitions are sensed or "read" from the disk 102 surfaces via one or more transducers 106, known as read/write heads, supported in close proximity to the disk 102 surfaces by a head positioning assembly 108, wherein the transducers 106 convert the transitions into electrical signals. The head positioning assembly 108 positions the transducers 106 over the disk 102 surfaces in a linear or rotary manner by operation of a voice coil motor (VCM) 110, which is controlled by a servo control loop that includes a servo controller 126.

The read/write heads 106, in addition to providing data read from the disk 102 surfaces, provide servo information from the disk 102 surfaces as a signal on line 114. A preamplifier (PRE-AMP) 116 receives and amplifies the servo information signal and provides the amplified signal to an automatic gain control (AGC) 118 that adjusts the gain applied to the signal to maintain the signal amplitude within a range that is predetermined to simplify information processing, reduce noise, and improve linearity. The amplified signal from the AGC 118 is provided to an analog-to-digital converter (ADC) 120 that asynchronously converts the signal.

The digitized servo information signal is provided to a PES demodulator (PES DEMOD) 122, which demodulates it into a primary position error signal (PESP) and a quadrature position error signal PESQ) that indicate the direction and extent of movement required to maintain the read/write head 106 centered about a track on the disk 102. The PESP and PESQ signals are derived from two sets of patterns (e.g., A, B, C, and D burst patterns where PESP=A–C and PESQ=B–D) that are quadrature to each other in space. The PESP and PESQ are cyclic and out of phase by ninety degrees or one quarter phase.

The ramp stitching block 124 discards the PESP and PESQ values beyond where the absolute value of PESP equals the absolute value of PESQ and "stitches" the linear sections of the PESP and PESQ values together at their endpoints to form a substantially linear PES for each track on the disk 102. If desired, the PES can be further linearized by the servo controller 126. The servo controller 126 then uses the PES to generate the control signals to the VCM 130 to move the head positioning assembly 108 and read/write heads 106.

The resulting PES indicates the deviation of the read/write head 106 from the centerline of a track. If the amplitude difference in information from both sides of the centerline is zero, then it is assumed that the read/write head 106 is positioned exactly over the centerline. A positive amplitude difference in the information indicates that the head 106 is off center in one direction and a negative amplitude difference in the information indicates that the head 106 is off center in the opposite direction. Thus, the PES provides an indication of the direction and extent of read/write head 106 movement required to maintain the head 106 centered about the track.

Servo Information

Figure 2:
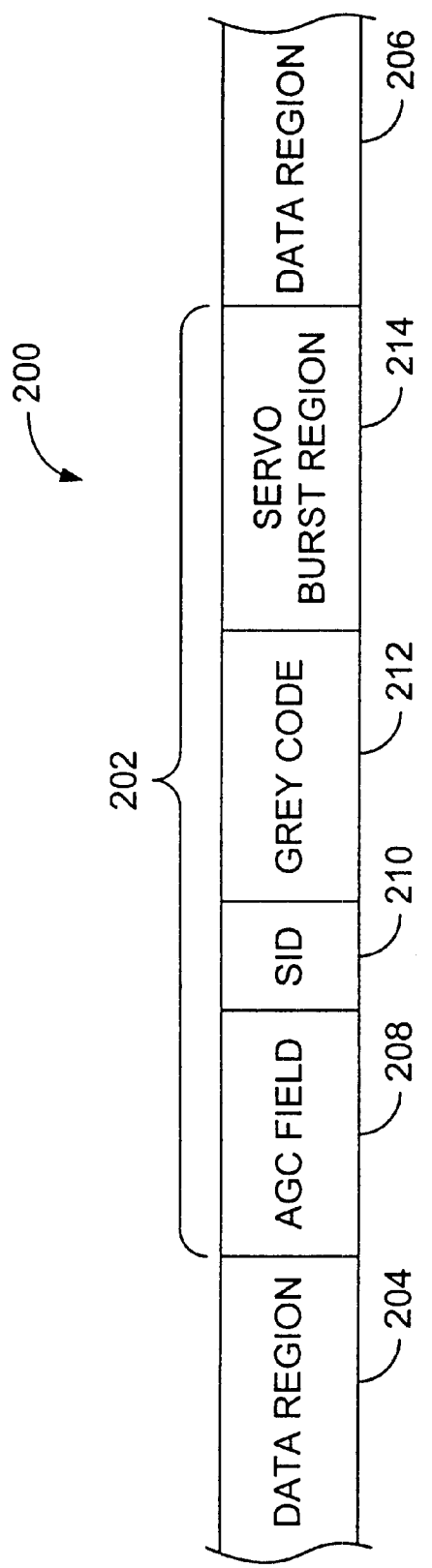
FIG. 2 illustrates an embedded servo sector according to the preferred embodiment of the present invention.

FIG. 2 illustrates the servo information 200 that is embedded in one or more servo sectors 202 on each disk 102 surface, wherein the servo sector 202 is embedded between data regions 204 and 206, although those skilled in the art will recognize that the servo information could be recorded on a separate disk 102 surface. The servo sector 202 comprises a synchronization or AGC field 208, a sector identification mark (SID) 210, a track identifier or Grey code 212, and a servo burst region 214. The AGC field 208 typically comprises a repeating synchronization pattern, and is used to adjust the servo detection logic of FIG. 1 to the amplitude and phase of the servo information to follow. The track identifier or Grey code field 212 includes a numerical value for uniquely identifying the current track and servo sector 202. The Grey code 212 comprises, for example, an encoded three bit binary number that varies by only one bit with respect to Grey codes of adjacent tracks. This field 212 also or alternatively includes track identifying information such as the cylinder, head and sector numbers corresponding to the particular servo sector 202. The Grey code field 212 is followed by a servo burst region 214, preferably of the quadrature burst type.

Position Error Signals

Figure 3:
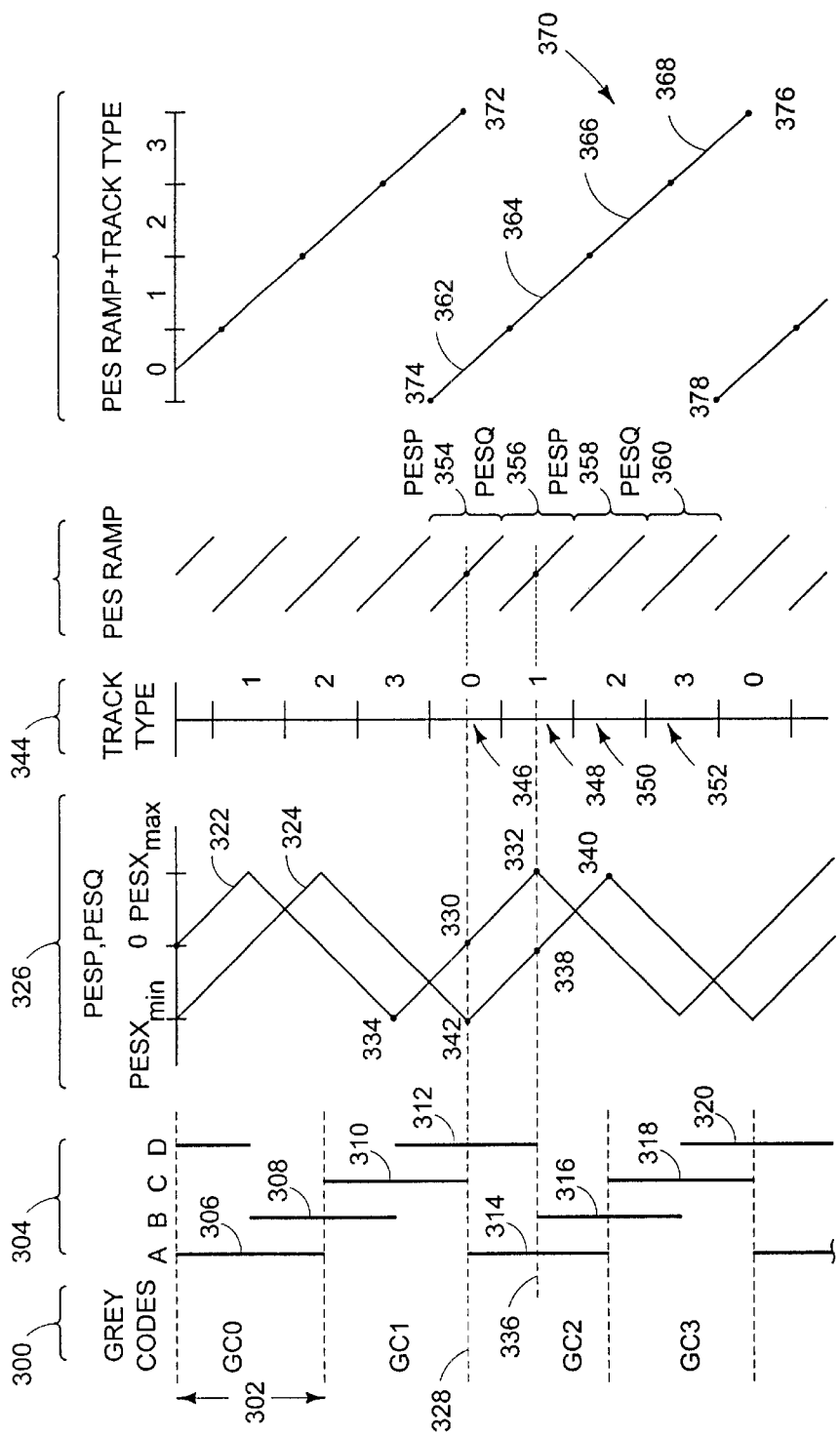
FIG. 3 illustrates the steps for generating a position signal from embedded servo sectors according to the preferred embodiment of the present invention.
Figure 4A:
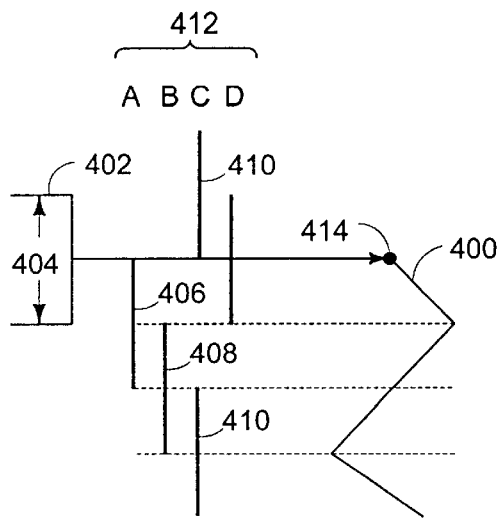
FIGS. 4A–4D are diagrams showing the relationship between a primary position error signal and a position of a read/write head having the same effective width as a transducer used to write servo bursts in a burst region.
Figure 4B:
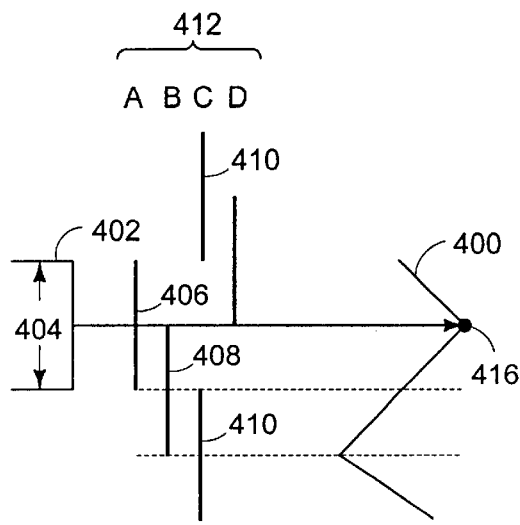
Figure 4C:
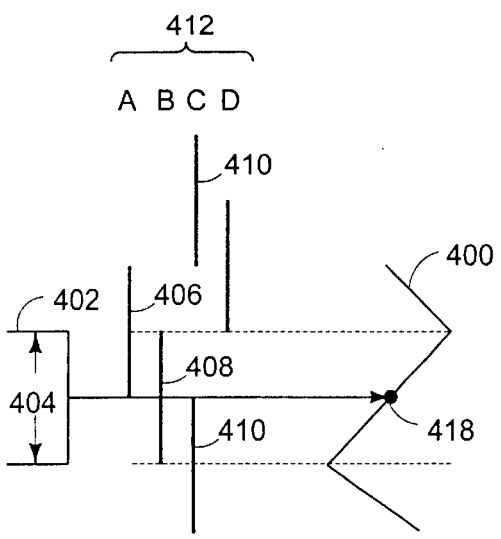
Figure 4D:
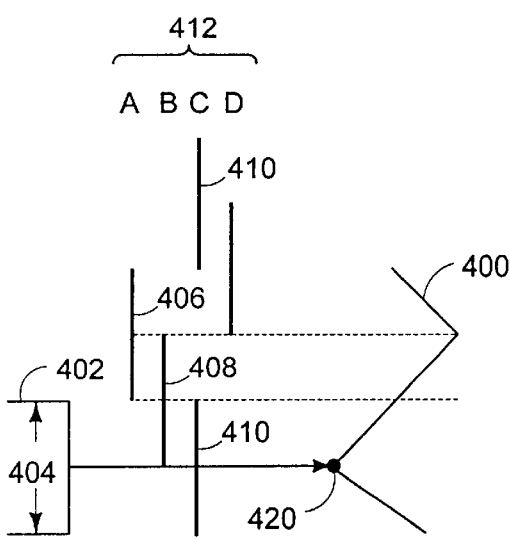
Figure 5A:
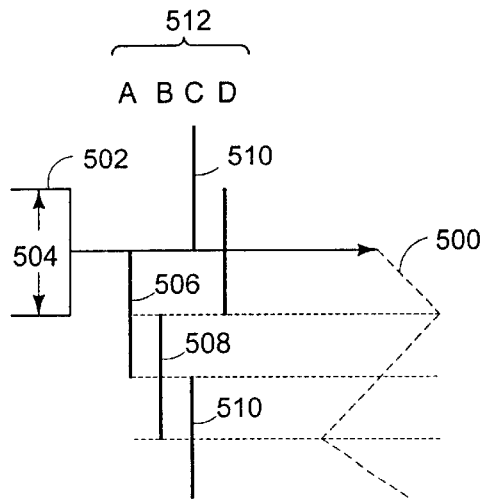
FIGS. 5A–5D are diagrams showing the relationship between a primary position error signal and a position of a read/write head having an effective width that is less than a transducer used to write servo bursts in a burst region.
Figure 5B:
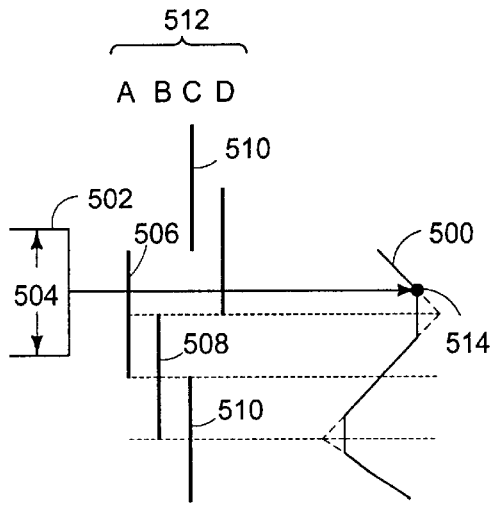
Figure 5C:
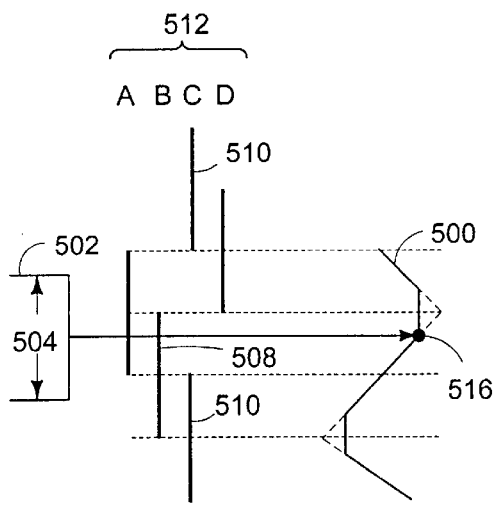
Figure 5D:
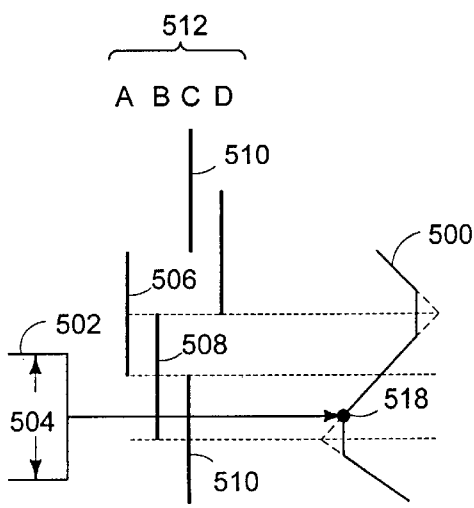

FIG. 3 illustrates the specific steps for generating a position error signal (PES) from the embedded servo information. A Grey code region 300 is shown including four Grey code tracks, each having a value as designated by the labels GC0–GC3. Numerous Grey code encoding schemes are used in the art, and the particular encoding scheme used is not considered pertinent to the present invention, provided that whichever Grey code or track identifying information is used, it will in some way enable identification of absolute track position. Grey code track width is indicated by the arrows 302.

Adjacent to the Grey code region 300 is the servo burst area 304. Two complete sets of radially disposed, analog quadrature burst patterns are shown with portions of other sets. It will be appreciated that while the preferred embodiment is described for a disk drive 100 employing quadrature burst servo patterns, the present invention is also applicable to disk drives 100 having other types of position information patterns, since the present invention provides a benefit to any servo positioning system that requires stitching of position error signals.

Each quadrature burst pattern comprises a group of four radially offset bursts, A–D, labeled as 306, 308, 310, and 312, and 314, 316, 318, and 320. In this example, bursts of the same group are radially offset by half of a Grey code track width 302. For example, the upper edge of burst B 308 is transversely offset from the upper edge of burst A 306 by half a track width. In addition, each group of servo bursts is radially offset from the other groups by two Grey code track widths 302. For example, the upper edge of burst A 306 and the upper edge of burst A 314 are radially offset by Grey code tracks GC0 and GC1.

As a read head 106 passes over the servo burst region 304, it senses the amplitudes of the nearest servo bursts and provides a composite, analog amplitude signal to the PRE-AMP 116, AGC 118, and ADC 120 of the servo detection logic. The PES DEMOD 122 receives the signal and generates two separate waveforms: a primary signal (PESP) 320 and a quadrature signal (PESQ) 322, as shown in column 326, wherein the waveforms of PESP 320 and PESQ 322 are functions of the transverse or radial head 106 position relative to the bursts.

In this example, PESP=A–C and PESQ=B–D, where A, B, C and D represent the sensed amplitudes of bursts A–D. Thus, the PESP signal 322 will ideally have a zero value whenever the read head 106 is radially positioned between any two adjacent A and C bursts, e.g., along line 328 as indicated by the corresponding zero crossing point 330. Each A=C point aligns with a Grey code track boundary. The signal will ideally have a maximum value whenever the read head 106 is positioned at the center of an A burst (e.g., point 332 corresponding to A burst 314) and a minimum value when the read head 106 is positioned at the center of a C burst (e.g., point 334 corresponding to C burst 310). Each maximum or minimum PESP signal 322 value corresponds to a center of a Grey code track, as indicated, for example, by line 336. The PESQ signal 324, in contrast, will ideally have a zero value at each Grey code track center (e.g., point 338 along line 336) whenever the read head 106 is radially positioned between any two B and D bursts. The PESQ signal 324 will ideally have a maximum or minimum value whenever the read head 106 is positioned on a Grey code track boundary (e.g., points 340 and 342).

The digitized waveforms of the PESP and PESQ signals 322 and 324 are represented as PESP(t) and PESQ(t) for a sample time t, and are used by the servo controller 126 to determine a current track type of four track types according to the following determination:

IF {PESP(t)>PESQ(t)}
THEN IF {PESP(t)<–PESQ(t)}
　　THEN the track type is 0 and PESP(t) will be used;
ELSE IF {PESP(t)>–PESQ(t)}
　　THEN the track type is 1 and PESQ(t) will be used;
IF {PESP(t)<PESQ(t)}
THEN IF {PESP(t)>–PESQ(t)}
　　THEN the track type is 2 and –PESP(t) will be used;
ELSE IF {PESP(t)<–PESQ(t)}
　　THEN the track type is 3 and –PESQ(t) will be used.

For any radial position, the track type determines whether the PESP(t) or the PESQ(t) signal (or their inverted signals, –PESP(t) and –PESQ(t)) will be used to generate the position error signal (PES).

Column 344 illustrates the relationship of the track types to the waveforms of the PESP and PESQ signals 322 and 324. As should be apparent, each type 0 track is defined to have a center at a zero crossing point of the PESP signal 322 when its slope is positive. For example, type 0 track 346 corresponds to zero crossing point 330, which is located along a rising segment of the PESP signal 322. Similarly, each type 1 track is centered at the zero crossing point of a positively sloping portion of the PESQ signal 324 (e.g., type 1 track 348 corresponding to zero crossing point 338 on a rising segment of the curve). Track types 2 and 3 are the inverses of track types 0 and 1. That is, their centers correspond to zero crossings along the negatively sloping portions of the PESP and PESQ signals 322 and 324, respectively (e.g., tracks 350 and 352). Conversely, track types 2 and 3 corresponding to zero crossings along the positively rising segments of the –PESP and –PESQ signals (not shown).

The PES is a composite signal formed by stitching together segments of the PESP, PESQ, –PESP and –PESQ signals as determined by track type. For example, when a read head 106 is positioned over the servo bursts within the range of a type 0 track 346, the PES contribution 354 is obtained from the PESP signal 322. As the head 106 moves into the respective ranges of the type 1 track 348, type 2 track 350, and type 3 track 352, the PES contributions 356, 358, and 360 are obtained from the PESQ, –PESP, and –PESQ curves, respectively. In this example, each segment ideally has maximum and minimum values of +0.25 and –0.25 Grey code track widths.

The various contributions are then stitched together at their endpoints to form an ideally linear PES. Stitching is performed by adding successively increasing vertical offsets, TT0off, TT1off, TT2off and TT3off, to each PES contribution as determined by track types, wherein TT0off is the track type 0 offset, TT1off is the track type 1 offset, TT2off is the track type 2 offset, and TT3off is the track type 3 offset. For this example, the ideal offsets are TT0off=0, TT1off=0.5, TT2off=1.0, and TT3off=1.5, where these offsets are specified in terms of Grey code track widths. These offsets are added to contributions 354, 356, 358, and 360 to obtain stitched segments 362, 364, 366, and 368, and form a larger segment 370. The larger segments 370 are further stitched at their respective endpoints by adding another offset to each stitched segment, wherein the offsets for the larger segments 370 are ideally determined by the absolute track address, which may be obtained from the track identifier or Grey code field 212. For example, endpoints 372 and 374 would be stitched together, as would endpoints 376 and 378, thus ideally forming a continuous, linear PES (not shown).

A number of different stitching schemes and design criteria may be used to ensure the linearity of the PES over the track width. Unfortunately, most schemes suffer under the increasing track densities of disk drive 100 components and the lack of scaling of certain key geometries in the design of magneto-resistive (MR) read/write heads 106. For example, the signal may not be constant over the width of the servo bursts, because the head 106 is a wedge and its base is wider than its top. Thus, as the head 106 measures the amplitude of the servo bursts, there may exist regions where there is no sensitivity change measured by the head 106. A narrow servo writer may also cause gaps between the servo bursts. These issues make it increasingly difficult to find a unique scheme to combine PESP and PESQ signals 322 and 324 in a such way as to guarantee the linearity of the PES.

FIGS. 4A–4D are diagrams showing the relationship between the PESP signal 400 and the position of a read head 402 having the same effective width 404 as the transducer used to write the servo bursts 406, 408 and 410 in the burst region 412. When the read head 402 is in the first position in FIG. 4A, the read head 402 reads both the A burst 406 and the C burst 410 in the same amount, and hence, the PESP signal 400, e.g., A–C, is at zero at 412. As the read head 402 moves to the second position in FIG. 4B, the contribution of the C burst 410 becomes less and the contribution of the A burst 406 becomes more, and the PESP signal 400 becomes larger, reaching its peak at 416 when the read head 402 is centered over the A burst 406. As the read head 402 moves to the third position in FIG. 4C, the contribution of the A burst 406 to the PESP signal 400 is reduced, and the contribution of the C burst 410 becomes greater, until they are again equal, and the PESP 400 signal crosses the zero point at 418. Eventually, when the read head 402 reaches the fourth position in FIG. 4D, the contribution from the A burst 406 is zero, and the contribution from the C burst 410 is at a maximum, and the PESP signal 400 reaches its minimum at 420.

FIGS. 5A–D are diagrams showing the relationship between the PESP signal 500 and the position of a read head 502 having an effective width 504 that is less than the effective width of the write transducer used to generate the servo bursts 506, 508, and 510 in the burst region 512. When the read head 502 is centered between the A burst 506 and the C burst 510 in FIG. 5A, the PESP signal 500 is zero. However, the output of the read head 502 reaches its maximum value in FIG. 5B, causing the PESP signal 500 to reach a plateau value 514 less than the peak value. The PESP signal 500 remains at this value until the read head 502 reaches a third position in FIG. 5C, where it begins to sense some of the C burst 510 and the PESP signal 500 drops from the plateau at 516. The PESP signal 500 continues to decrease until it reaches a fourth position in FIG. 5D where it has a minimum plateau value at 518. Hence, when the effective width of the read head 502 is narrow, non-linearities in the PESP signal 500 can result. These non-linearities manifest themselves in the PES signal as well.

Read head 106 sensitivity non-linearities also contribute to non-ideal PESP signal waveforms. In the examples discussed in reference to FIGS. 4 and 5, the read head 106 was assumed to have a linear sensitivity across its entire width. However, actual read heads 106 do not exhibit this characteristic. Instead, they are typically more sensitive in the region near the center of the read head 106, and less sensitive at the edges of the effective width. Further, as described in U.S. Pat. No. 5,825,579, which is incorporated by reference herein, the read head 106 is also subject to errors induced by the trapezoidal geometry of the head 106, the geometry of the arms on the head positioning assembly 108, the geometry of the servo bursts, and the geometry of the disk surfaces 102. These read head 106 sensitivity and geometry characteristics can combine with the effects from the read head 106 width to further impact the accuracy of the PESP signal.

Non-Repeatable and Repeatable Run Out

Run out is the inability of the servo controller 126 to position the heads 106 exactly over a track center. It is usually divided into the repeatable portion (RRO) and the non-repeatable portion (NRRO). NRRO and RRO are two categories used to generally classify disturbances that affect the function of the servo controller 126 in positioning the heads 106. One of the major sources of RRO is the servo information write process that occurs during manufacturing. Any NRRO disturbance (bearing noise, air turbulence, servo writer vibration, etc.) that occurs during the writing of the servo information is essentially frozen into the written position and becomes the RRO for the particular track. Nonetheless, once the servo information has been written, the resulting PES can be measured and the run out resulting therefrom calculated. The calculated run out can then be used to compensate for non-linearity in the PES.

The RRO and/or NRRO are measured on a plurality of points on a track, such as track center and one or more points offset from track center, for example the stitch points. Because the head 106 is non-linear, the characteristics of these measurements will change with the offset. It is this change that allows the non-linearity to be determined, so that a "linearizing" equation can be used to improve the track following capability of the disk drive 100.

One caution is that if the run out (RRO or NRRO) is measured near a stitch point, only the PESP signal or PESQ signal can be used. This is to avoid distorting the measurement by allowing factors unrelated to the non-linearity of the head 106 to enter into the measurement. Specifically, the discontinuities that can occur at the stitch points will change the run out beyond that which is induced by the head 106, and the PESP and PESQ signals will have different run out characteristics, and so the change in run out will be due to the fact that a different signal is being used, as much as to the fact that the head 106 is non-linear. Consequently, a requirement of this technique is that the "unstitched" signal must be used.

The information that is extracted from the run out measurements is also important. For example, the average, in a root mean square (RMS) sense, can be used. However, as the head 106 linearity changes, the servo loop gain changes differently at different frequencies. So the "average" value may change differently depending on spectral content of the run out. Thus, it may be advantageous to consider a particular frequency of the run out, or a set of frequencies of the run out, or a root mean square of the run out, or some other characteristic of the run out, where the gain of the servo loop varies in an easy-to-model fashion. For example, the 8X RRO component on a 10,000 RPM disk drive 110 is at 1336 Hz, and is often one of the strongest components present. The servo control loop gain as a function the head 106 linearity can be predicted, so the change in the size of the 8X RRO component can then be mapped back to the head 106 linearity. Indeed, since the average gain of the head 106 has been controlled already, all that is required is to adjust the linearizing equation, so that the measurements are the same at both stitch points.

The process generally includes the following steps: (1) measure the run out at two or more points, such as the track center and at an offset from track center near the stitch point, using only the PESP (or PESO) and not the stitched PES; (2) extract a component of the run out, such as the size of the 8X RRO component, at the measured points; (3) adjust the linearizing equation so that the run out and the run out component are substantially similar at the measured points; and (4) repeat the measurement to guarantee that a good fit was achieved in the linearizing equation. In addition, some other characteristic may be measured as well as a further check of the fit (or not, as desired).

One other aspect is that the actions of measuring the run out and deciding on the linearizing equation can be done either by the disk drive 100 itself, or can be done during manufacturing with the aid of a tester. The tester generally comprises a computer communicating with the disk drive 100 over a standard interface, wherein the computer executes software that extracts and analyzes the NRRO or RRO.

Another point is that the linearizing equation is best calculated as a polynomial function of PES, with the result of the function being the actual position. The coefficients of this polynomial are calculated by head 106, and perhaps as a function of the location of the head 106 on the disk surface 102, as the non-linearity can change across the stroke of the arms of the head positioning assembly 108. The coefficients are preferably stored in non-volatile memory, e.g., in an electronic memory in the disk drive 100 or at a special location on the disk surfaces 102, and then loaded to the servo controller 126 at start up. The servo controller 126 then uses the linearizing equation while determining the position from the PESP and PESQ.

Logic of the Preferred Embodiment

Figure 6:
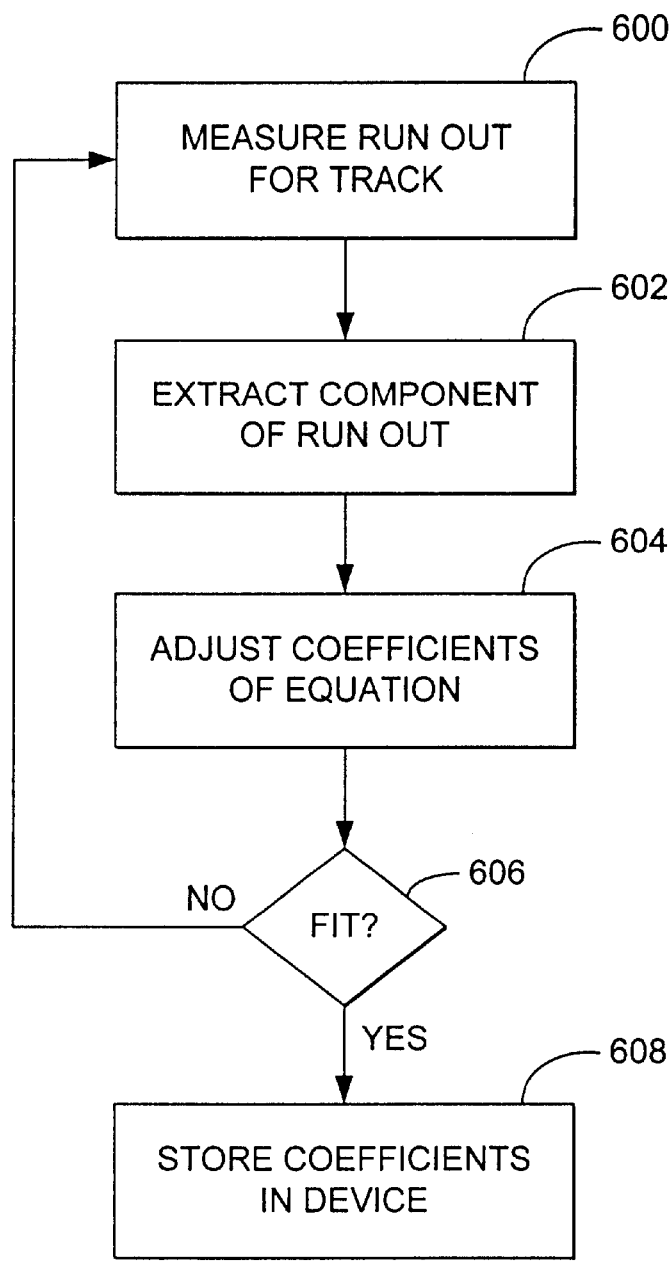
FIG. 6 is a flow chart illustrating the logic performed by the preferred embodiment of the present invention.

FIG. 6 is a flow chart illustrating the logic performed by the preferred embodiment of the present invention to provide linearity compensation for a position error signal based on repeatable run out.

Block 600 represents the run out being measured on a track at a plurality of points, such as a track center and one or more points offset from the track center. The run out is typically measured using either an unstitched PESP or PESQ. The offsets are usually the stitch points for the PESP or PESQ.

Block 602 represents a component of the run out being extracted at the measured points. The component generally comprises a frequency, a set of frequencies, a root mean square, or some other characteristic of the run out.

Block 604 represents the coefficients of a linearizing equation being adjusted so that the run out and the component of the run out are substantially similar at the measured points. This Block may also represent identifying the linearizing equation to be used based on the measured run out, wherein the linearizing equation is usually a polynomial function. The coefficients of the equation my be calculated according to the transducer or the transducer's location of a recording surface.

Block 606 represents a loop being performed for Blocks 600, 602, and 604 until a satisfactory fit is achieved in the linearizing equation. Once a satisfactory fit is achieved, control transfers to Block 608; otherwise, control transfers back to Block 600.

Block 608 stores the coefficients for the linearizing equation in the disk drive 100, e.g., in non-volatile memory, on the disk surfaces 102 themselves, etc., so that the coefficients can be accessed by the servo controller 126 during operation of the disk drive 100. During operation, the servo controller 126 uses the linearized position error signal resulting from the linearizing equation to improve the track following capability of the disk drive 100.

CONCLUSION

This concludes the description of the preferred embodiment of the present invention. Generally, the preferred embodiment of the present invention is implemented as programming within the servo controller 126 and/or as programming within a tester. This programming comprises instructions and/or data that is embodied in or retrievable from a device, medium, or carrier. Moreover, these instructions and/or data, when read, executed, and/or interpreted by the servo controller 126 and/or tester, cause the servo controller 126 and/or tester to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions embodied in or accessible from any device, carrier, or media.

Of course, those skilled in the art will recognize many modifications may be made to this implementation without departing from the scope of the present invention. Indeed, those skilled in the art will recognize that any combination of the above components, or any number of different components, including programmable or non-programmable devices and circuits, may be used to implement the present invention, so long as similar functions are performed thereby.

In addition, the present invention can be applied to any number of different data storage devices. For example, any type of rotating data storage device, such as a magnetic, optical, or other device, could benefit from the present invention. Moreover, different electronics or logic could be used to implement the present invention.

In conclusion, the present invention provides linearity compensation for a position error signal based on run out in a data storage device. The run out is measured on a track of the data storage device at a plurality of points, such as a track center and one or more points offset from the track center. The run out is typically measured using either an unstitched primary position error signal or an unstitched quadrature position error signal. The offsets are usually stitch points for the position error signal. A component of the run out is extracted at the measured points, wherein the component generally comprises a frequency, a set of frequencies, a root mean square, or some of characteristic of the run out. The linearizing equation to be used for the position error signal is identified based on the measured run out and generally comprises a polynomial function. The coefficients of the linearizing equation are adjusted so that the run out and the component of the run out are substantially similar at the measured points. These steps are repeated until a satisfactory fit is achieved in the linearizing equation. Once a satisfactory fit is achieved, the coefficients for the linearizing equation are stored in the data storage device, so that they can be accessed by a servo controller during operation of the data storage device. The servo controller uses the linearizing equation to generate a linearized position error signal that is used to improve a track following capability of the data storage device.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing linearity compensation for a position error signal based on run out in a data storage device, comprising:

(a) measuring the run out at a plurality of points on a track of the data storage device;

(b) extracting a component of the run out at the measured points; and (c) adjusting coefficients of a linearizing equation for the position error signal so that the run out and the component of the run out are substantially similar at the measured points.

2. The method of claim 1, further comprising repeating the measuring, extracting, and adjusting steps until a satisfactory fit is achieved in the linearizing equation.

3. The method of claim 1, further comprising identifying the linearizing equation based on the measured run out.

4. The method of claim 1, wherein a result of the linearizing equation is an linearized position error signal.

5. The method of claim 4, wherein the linearized position error signal improves a track following capability of the data storage device.

6. The method of claim 1, wherein the linearizing equation is a polynomial function.

7. The method of claim 1, wherein the coefficients are calculated according to a transducer's location of a recording surface.

8. The method of claim 1, wherein the coefficients are stored in the data storage device.

9. The method of claim 1, wherein the run out is measured using an unstitched position error signal.

10. The method of claim 1, wherein the component of the run out comprises at least one characteristic of the run out.

11. The method of claim 1, wherein the points comprise a track center and one or more points offset from the track center.

12. An apparatus for providing linearity compensation for a position error signal based on run out in a data storage device, comprising:

(a) means for measuring the run out at a plurality of points on a track of the data storage device;

(b) means for extracting a component of the run out at the measured points; and (c) means for adjusting coefficients of a linearizing equation for the position error signal so that the run out and the component of the run out are substantially similar at the measured points.

13. The apparatus of claim 12, further comprising means for repeating the means for measuring, extracting, and adjusting until a satisfactory fit is achieved in the linearizing equation.

14. The apparatus of claim 12, further comprising means for identifying the linearizing equation based on the measured run out.

15. The apparatus of claim 12, wherein a result of the linearizing equation is an linearized position error signal.

16. The apparatus of claim 15, wherein the linearized position error signal improves a track following capability of the data storage device.

17. The apparatus of claim 12, wherein the linearizing equation is a polynomial function.

18. The apparatus of claim 12, wherein the coefficients are calculated according to a transducer's location of a recording surface.

19. The apparatus of claim 12, wherein the coefficients are stored in the data storage device.

20. The apparatus of claim 12, wherein the run out is measured using an unstitched position error signal.

21. The apparatus of claim 12, wherein the component of the run out comprises at least one characteristic of the run out.

22. The apparatus of claim 12, wherein the points comprise a track center and one or more points offset from the track center.

23. A linearity compensated position error signal based on run out in a data storage device, wherein the position error signal is generated by method steps comprising:

(a) measuring the run out at a plurality of points on a track of the data storage device;

(b) extracting a component of the run out at the measured points; and (c) adjusting coefficients of a linearizing equation for the position error signal so that the run out and the component of the run out are substantially similar at the measured points.

24. The method of claim 23, further comprising repeating the measuring, extracting, and adjusting steps until a satisfactory fit is achieved in the linearizing equation.

25. The method of claim 23, further comprising identifying the linearizing equation based on the measured run out.

26. The method of claim 23, wherein a result of the linearizing equation is an linearized position error signal.

27. The method of claim 26, wherein the linearized position error signal improves a track following capability of the data storage device.

28. The method of claim 23, wherein the linearizing equation is a polynomial function.

29. The method of claim 23, wherein the coefficients are calculated according to a transducer's location of a recording surface.

30. The method of claim 23, wherein the coefficients are stored in the data storage device.

31. The method of claim 23, wherein the run out is measured using an unstitched position error signal.

32. The method of claim 23, wherein the component of the run out comprises at least one characteristic of the run out.

33. The method of claim 23, wherein the points comprise a track center and one or more points offset from the track center.

34. An article of manufacture embodying logic for providing linearity compensation for a position error signal based on run out in a data storage device, comprising:

(a) measuring the run out at a plurality of points of a track of the data storage device;

(b) extracting a component of the run out at the measured points; and (c) adjusting coefficients of a linearizing equation so that the run out and the component of the run out are substantially similar at the measured points.

35. The logic of claim 34, further comprising repeating the measuring, extracting, and adjusting steps until a satisfactory fit is achieved in the linearizing equation.

36. The logic of claim 34, further comprising identifying the linearizing equation based on the measured run out.

37. The logic of claim 34, wherein a result of the linearizing equation is an linearized position error signal.

38. The logic of claim 34, wherein the linearized position error signal improves a track following capability of the data storage device.

39. The logic of claim 34, wherein the linearizing equation is a polynomial function.

40. The logic of claim 34, wherein the coefficients are calculated according to a transducer's location of a recording surface.

41. The logic of claim 34, wherein the coefficients are stored in the data storage device.

42. The logic of claim 34, wherein the run out is measured using an unstitched position error signal.

43. The logic of claim 34, wherein the component of the run out comprises at least one characteristic of the run out.

44. The logic of claim 34, wherein the points comprise a track center and one or more points offset from the track center.

* * * * *

UNITED STATES PATENT AND TRADEMARK OFFICE
CERTIFICATE OF CORRECTION

PATENT NO.    : 6,421,198 B1   Page 1 of 1
DATED         : July 16, 2002
INVENTOR(S)   : Bernd Lamberts et al.

It is certified that error appears in the above-identified patent and that said Letters Patent is hereby corrected as shown below:

Column 10,
Line 55, "an" should read -- a --

Column 11,
Line 26, "an" should read -- a --

Column 12,
Lines 5 and 39, "an" should read -- a --

Signed and Sealed this

Fifteenth Day of April, 2003

JAMES E. ROGAN
*Director of the United States Patent and Trademark Office*